United States Patent
Gordon et al.

(10) Patent No.: US 7,583,732 B2
(45) Date of Patent: Sep. 1, 2009

(54) MANAGING BURSTS OF DATA

(75) Inventors: Stephen Gordon, North Andover, MA (US); John Iler, Burlington, MA (US); Tim Hellman, Concord, MA (US)

(73) Assignee: Broadcom Corporation, Irvine, CA (US)

( * ) Notice: Subject to any disclaimer, the term of this patent is extended or adjusted under 35 U.S.C. 154(b) by 689 days.

(21) Appl. No.: 10/729,443

(22) Filed: Dec. 5, 2003

(65) Prior Publication Data

US 2004/0114690 A1    Jun. 17, 2004

Related U.S. Application Data

(60) Provisional application No. 60/431,407, filed on Dec. 6, 2002.

(51) Int. Cl.
*H04N 7/12* (2006.01)
(52) U.S. Cl. .................... 375/240.25; 711/2; 711/4; 711/102; 711/105; 711/201; 348/383; 348/448; 345/544
(58) Field of Classification Search ............. 375/240, 375/250; 711/4, 6, 102, 105, 2, 201; 348/383, 348/448; 345/544
See application file for complete search history.

(56) References Cited

U.S. PATENT DOCUMENTS

| | | | | |
|---|---|---|---|---|
| 5,826,053 | A * | 10/1998 | Witt | 712/210 |
| 6,493,795 | B1 * | 12/2002 | Arsenault et al. | 711/114 |
| 6,526,496 | B1 * | 2/2003 | Hartman et al. | 711/201 |
| 6,711,494 | B2 * | 3/2004 | Peel et al. | 701/201 |
| 2002/0166037 | A1 * | 11/2002 | Launiainen | 711/201 |
| 2002/0171653 | A1 * | 11/2002 | Lavelle et al. | 345/544 |
| 2002/0174317 | A1 * | 11/2002 | Schroeder | 711/201 |
| 2004/0100577 | A1 * | 5/2004 | Linzer et al. | 348/383 |
| 2004/0155883 | A1 * | 8/2004 | Ju et al. | 345/544 |

* cited by examiner

*Primary Examiner*—Shuwang Liu
*Assistant Examiner*—Helene Tayong
(74) *Attorney, Agent, or Firm*—McAndrews, Held & Malloy, Ltd.

(57) ABSTRACT

Bursts of data are managed. Data is stored in a machine readable memory device a first time at a first memory address. The machine readable memory device has one or more burst boundaries. The first memory address has a first alignment with respect to the burst boundaries. The data is stored in the machine readable memory device a second time at a second memory address. The second memory address has a second alignment with respect to the burst boundaries.

23 Claims, 5 Drawing Sheets

MANAGING BURSTS OF DATA

CROSS REFERENCE TO RELATED APPLICATIONS

The present application claims the benefit of and priority to U.S. provisional application Ser. No. 60/431,407, filed Dec. 6, 2002, entitled "Method For Improving Memory Read Efficiency and Arithmetic Coding Speed," the entire disclosure of which is herein incorporated by reference.

TECHNICAL FIELD

The invention relates to managing bursts of data. In particular, an aspect of the invention relates to storing memory data multiple times within a memory with different burst alignments such that the required number of bursts may be reduced for the worst case.

BACKGROUND OF THE INVENTION

Video decoders include a function commonly referred to as "motion compensation." This function is necessary to allow the decoder to process numerous different video compression standards, including but not necessarily limited to: MPEG-1, MPEG-2, MPEG-4, H.263, H.264, and H.261. More specifically, motion compensation includes a process of copying a two-dimensional block of image data from a previously decoded reference frame to the frame currently being decoded. The location of the reference block relative to the current position in the current frame is specified by "motion vectors" included within the input code stream. Motion compensation allows for a compact specification of the data whenever the video stream is well modeled by translational motion.

Typically, reference frames that are used for motion compensation are stored in a relatively large memory (typically DRAM). To improve general performance, DRAMs are generally accessed in bursts of data (usually 2, 4, 8, or 16 data words in a burst). For memory data interfaces that have a word size of 4 bytes and are 32 bits wide and a burst size of 2 words, each burst accesses 8 bytes of data (2 words×4 bytes per word). However, bursts can only access data aligned to burst boundaries, and therefore a burst of N words must be aligned to an address integrally divisible by N.

SUMMARY OF THE INVENTION

In general, the invention relates to managing bursts of data. Aspects of the invention relate to methods of storing and retrieving data that reduces the number of bursts needed to read data aligned in the worst case manner with respect to burst boundaries.

In at least one aspect, the invention relates to a method of storing data. The method includes storing data in a machine readable memory device a first time at a first memory address, where the machine readable memory device has one or more burst boundaries and the first memory address has a first alignment with respect to the burst boundaries, and storing the data in the machine readable memory device a second time at a second memory address, where the second memory address has a second alignment with respect to the burst boundaries.

In at least some embodiments, the data represents a reference frame for use in a video decoder, which in some embodiments may be an h.264 codec. The machine readable memory device can be volatile memory such as static random access memory or in some embodiments dynamic random access memory. In some embodiments, the machine readable memory device may be non-volatile memory such as read-only memory.

In at least some embodiments, the data may be stored in the machine readable memory device a third time at a third memory address, where the third memory address has a third alignment with respect to the burst boundaries.

In another aspect, the invention relates to a method of retrieving data from a machine readable memory device. The method includes determining a set of desired bytes of data, the set of desired bytes of data having been previously stored in a machine readable memory device at two or more memory addresses, the memory device having at least one burst boundary, and each memory address having a different alignment with respect to the at least one burst boundary. The method further includes retrieving the desired bytes of data from a preferred the memory address, the preferred memory address being aligned with the at least one burst boundary such that the number of bursts necessary to read the desired bytes from the preferred memory address is fewer than the number of bursts necessary to read the desired bytes from the other memory addresses.

While particularly useful in the field of encoded video data, these methods are not limited to that specific application, and can be used in similar applications where data is stored in and read from memory devices.

BRIEF DESCRIPTION OF THE DRAWINGS

In the drawings, like reference characters generally refer to the same elements throughout the different views. In addition, the drawings are not necessarily to scale, emphasis instead generally being placed upon illustrating the principles of the invention.

DETAILED DESCRIPTION

Reference blocks used for motion compensation consist of 2 dimensions of image data which are often small relative to the burst size of a memory device such as DRAM. Video data is stored in raster order—i.e. it is scanned on a row by row basis with the upper left pixel being stored at the lowest address of the picture memory and the lower right pixel at the highest address in the picture memory. For example, a 13 pixel by 13 line block of a single image component may be broken into 13 reads (1 read for each line). Where one component of one pixel equals one byte of data, 13 bytes can be read from each line for each image component. Where the memory data interface to the computing device is 32 bits wide (a word size of 4 bytes) and the burst size is 2 words, then each burst accesses 8 bytes of data (2 words×4 bytes per word).

Therefore, even though the data for each line of the reference block may be read from DRAM in either two or three bursts, the worst case burst alignment must be assumed to account for the alignments requiring a three burst read. This results in reduced read efficiency and slower processing. In cases where the video data is of a high resolution, the slower processing may limit the quality of the data the system can process.

Figure 1:
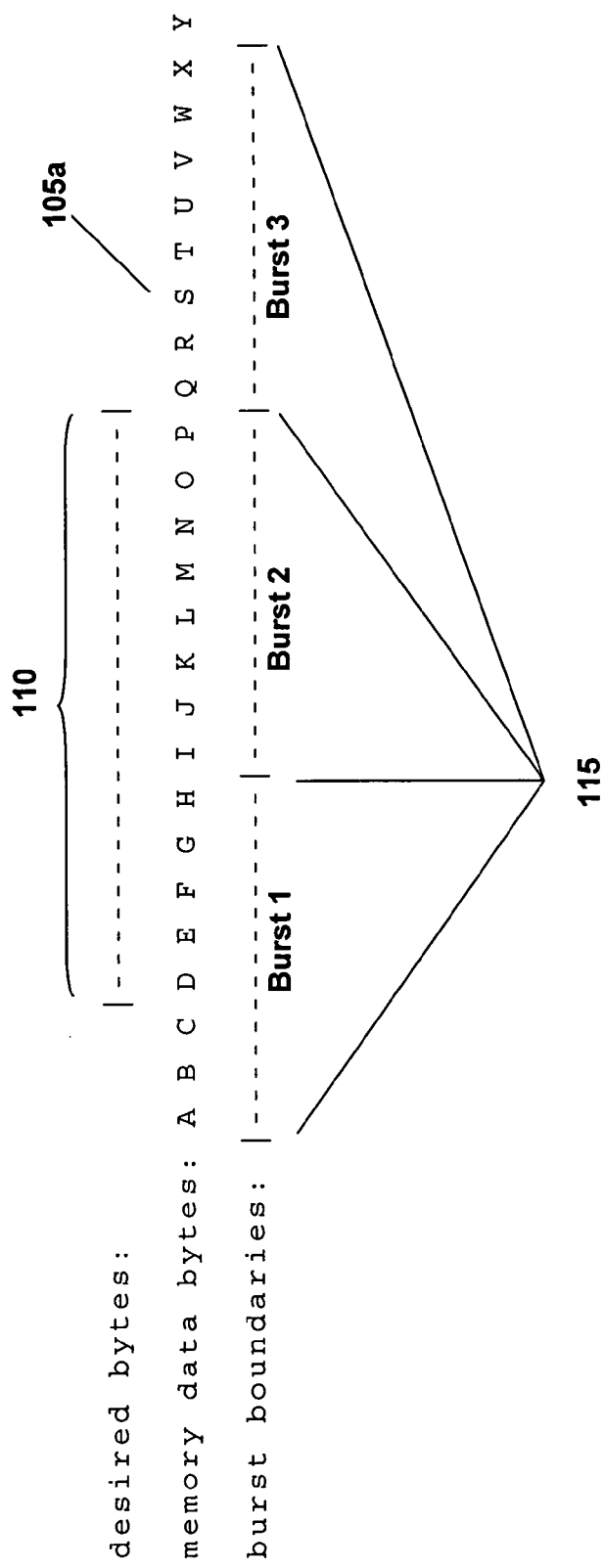
FIG. 1 illustrates storing data at one memory address.

Referring to FIG. 1, a set of memory data bytes represented by the letters A-Y (105*a*) resides at a given memory address within a machine readable memory such as DRAM. Further, a subset of the set of 13 memory data bytes D-P (110) represents a desired subset of the set of memory data bytes 105*a* in that they contain information requested by a computing device (not shown). However, bursts can only access data aligned to burst boundaries 115 (i.e. a burst of N words must be aligned to an address integrally divisible by N). Therefore, only 2 bursts of 8 bytes are required to read the 13 desired bytes (110)—burst 1 reads bytes A-H and burst 2 reads bytes I-P. In total, bytes A-P are read in order to obtain the data in bytes D-P. This yields an efficiency of 81% on DRAM data cycles (reading 16 bytes to get the 13 desired bytes.)

Figure 2:
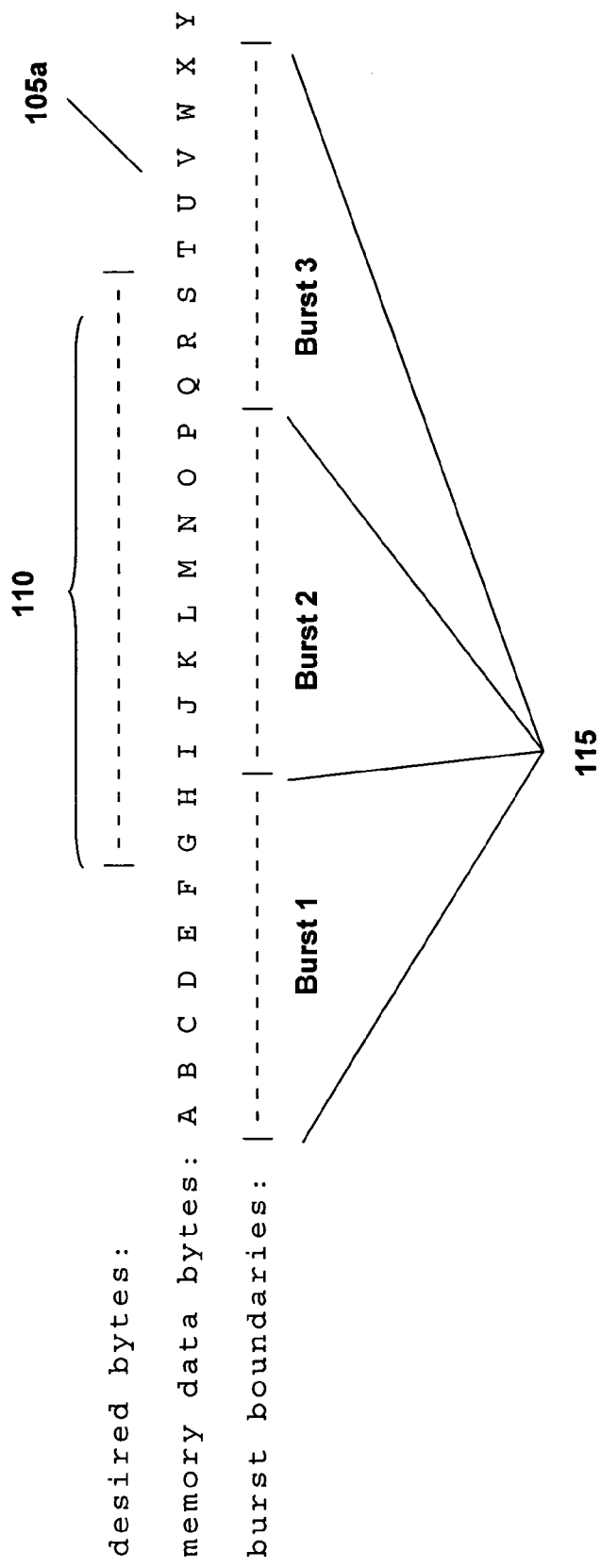
FIG. 2 illustrates another example of storing data at one memory address.

Referring to FIG. 2, if the desired data 110 is stored at data bytes G-S, the alignment of the memory data bytes 105*a* and the burst boundaries 115 require 3 bursts of 8 bytes to get the desired data 110. Thus, 24 bytes of data are read (A-X) to retrieve 12 bytes of desired data G-S 110. This yields an 54% efficiency on DRAM data cycles (reading 24 bytes to get the 13 desired bytes.) When designing to the worst case, the lowest efficiency number must be used because it is possible that the required data will always have the worst alignment as illustrated in FIG. 2. When designing to the average case, the reduced efficiency of the FIG. 2 case will degrade the average DRAM read efficiency achieved.

To improve the read efficiency, memory data is stored multiple times within the memory with different burst alignments such that the required number of bursts is reduced for the worst case alignment. As a result, both the worst-case and average efficiency improve. Accesses within a single burst are highly efficient (1 word per clock cycle with single data rate (SDR) DRAM, 2 words per clock cycle with double data rate (DDR) DRAM).

Figure 3:
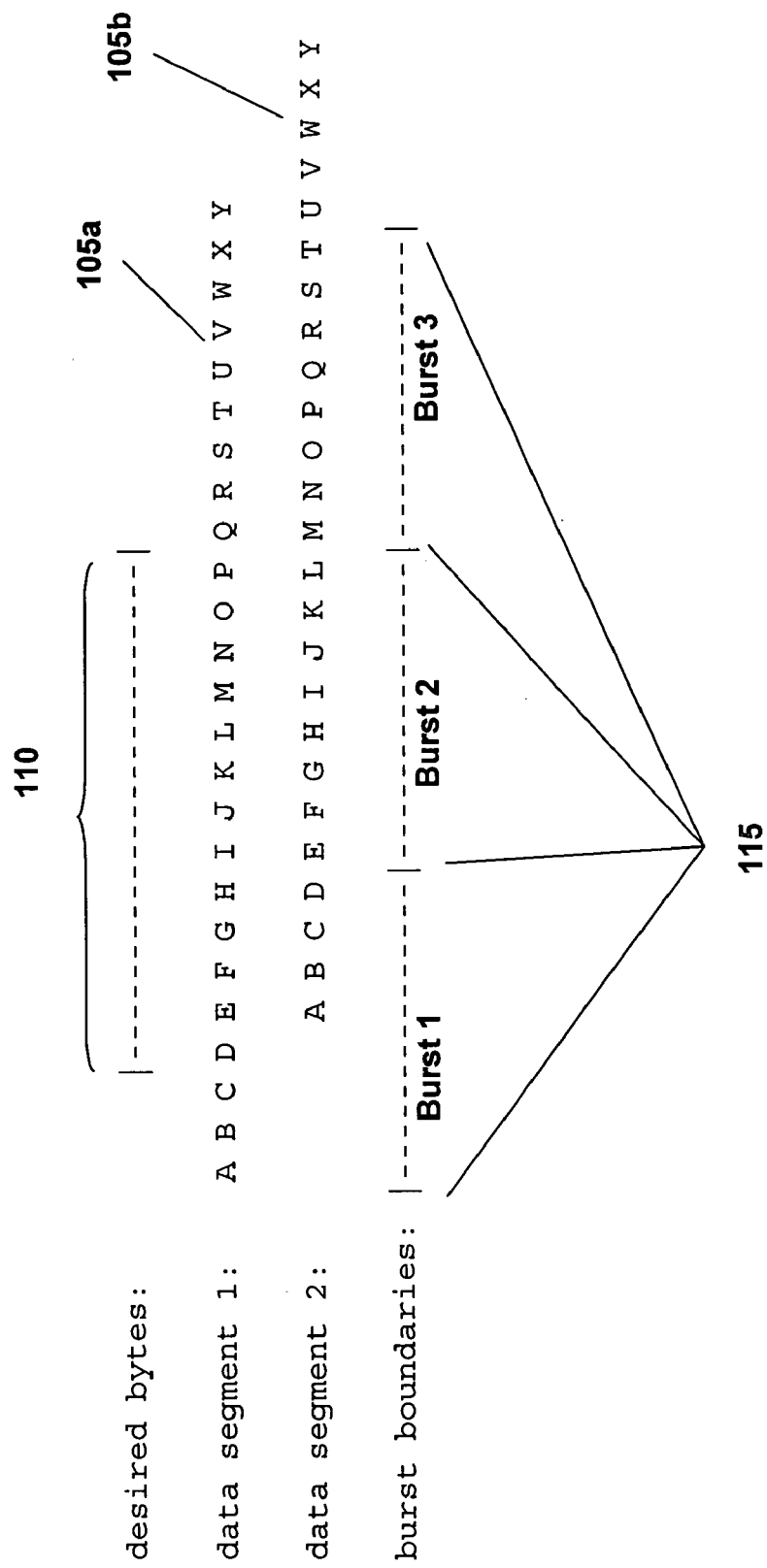
FIG. 3 illustrates storing data at two memory addresses.
Figure 4:
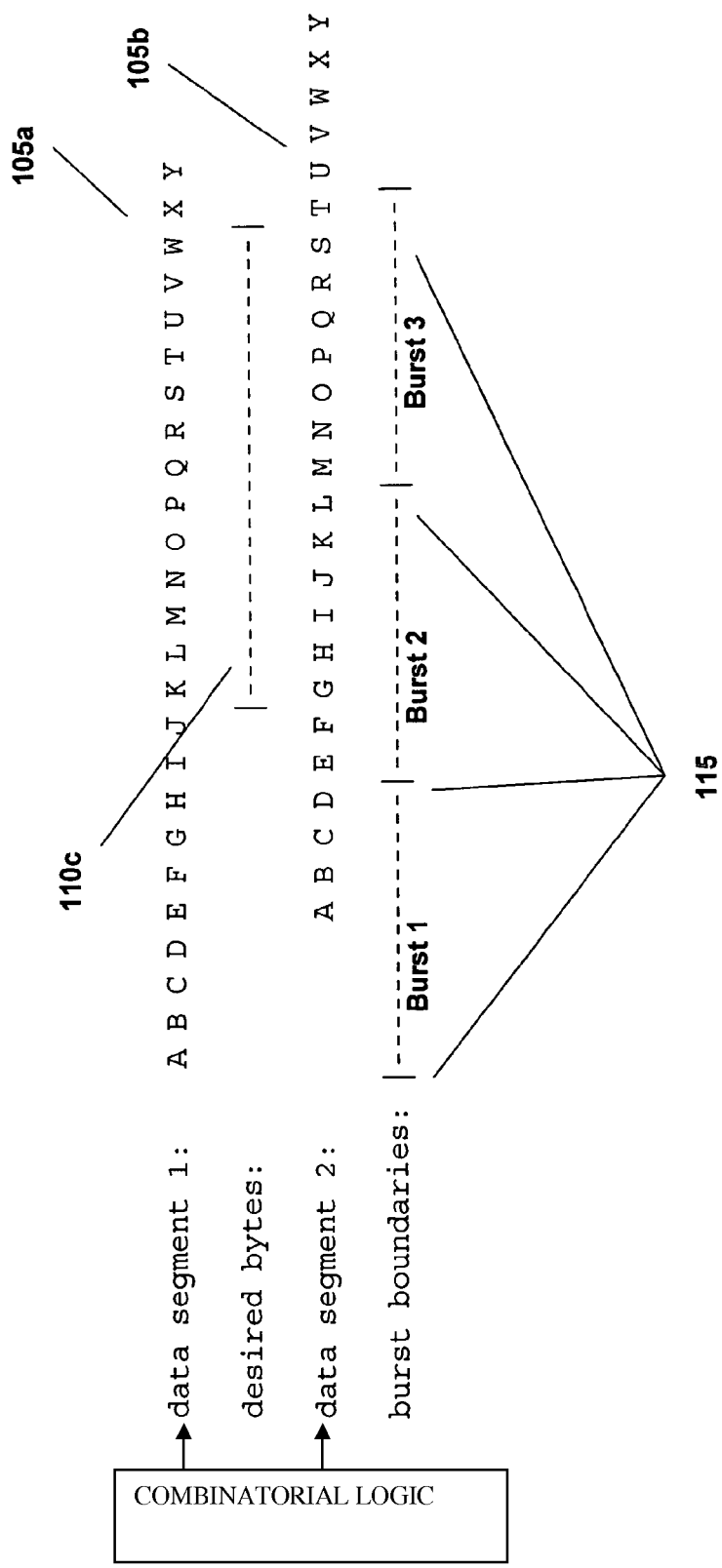
FIG. 4 illustrates another example of storing data at two memory addresses.

FIG. 3 illustrates an example embodiment in which the same set of data is stored twice (110*a* and 110*b*). To retrieve the desired bytes of data D-P (105*b*), the first set of data 110*a* is used. To do so, only two bursts of data are needed (burst 1 and burst 2) and the read efficiency is 81% (13 desired bytes/16 read bytes). However, as illustrated in FIG. 4, if the bytes G-S 105*c* are requested, the data is read from the second set of data 110*b*. Reading the desired data 105*c* from the first data segment would require three bursts, while reading the desired data 110*c* from data segment 2 requires only two bursts. With the data duplicated twice, all accesses of 13 bytes or less are now guaranteed to only require 2 bursts, leading to a worst case (and average) efficiency of 81%.

In one embodiment, the segment of data with the better alignment with respect to the burst boundaries is determined using combinatorial logic. For example, let A represent the address of the first byte sequence. If (A modulo 8)≦3, the first data segment is used. If (A modulo 8)>3, the second data segment is used.

Another embodiment uses duplication factors greater than 2. By duplicating the data more times, more alignments can be stored, which is highly useful when different desired data lengths or different burst sizes are required. As a result, at least one implementation relies on a tradeoff of memory usage and write timing for reading efficiency.

Figure 5:
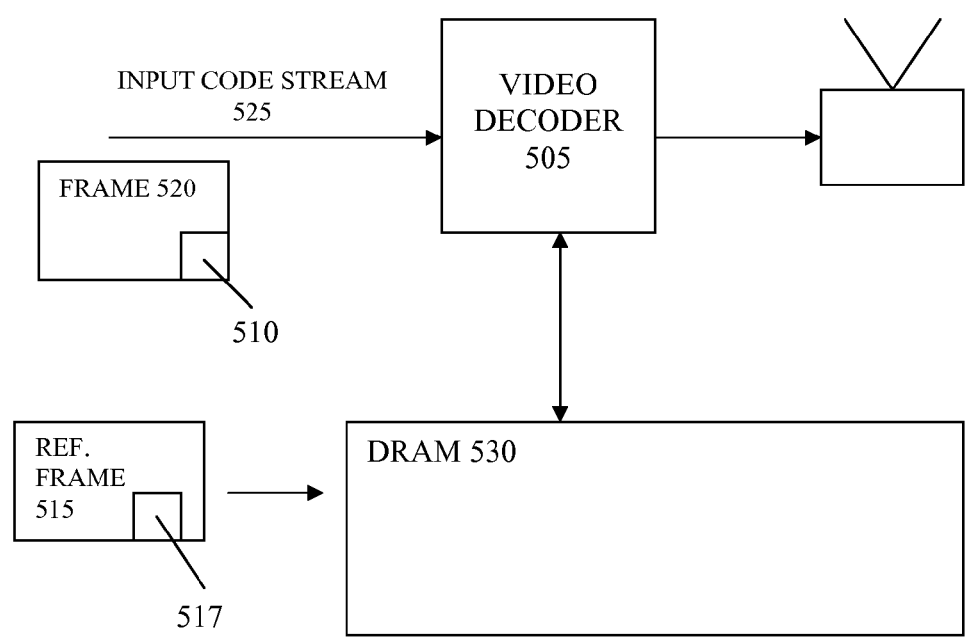
FIG. 5 is a block diagram of an exemplary circuit for decoding video data in accordance with an embodiment of the present invention.

Referring now to FIG. 5, there is illustrated a block diagram describing an exemplary circuit 500 for decoding video data in accordance with an embodiment of the present invention. A video decoder 505 includes a function commonly referred to as "motion compensation." This function is used to allow the video decoder 505 to process numerous video compression standards, including but not necessarily limited to: MPEG-1, MPEG-2, MPEG4, H.263, H.264, and H.261. More specifically, motion compensation includes a process of copying a two-dimensional block 510 of image data from a previously decoded reference frame 515 to the frame 520 currently being decoded. The location of the reference block 517 relative to the current position in the current frame is specified by "motion vectors" included within the input code stream 525. Motion compensation allows for a compact specification of the data whenever the video stream is well modeled by translational motion. The reference frame 515 that is used for motion compensation is stored in a relatively large memory, such as DRAM 530. The DRAM 530 can be configured to store the reference frame 515 in the manner described in FIGS. 3 and 4. In one embodiment, segments of data with better alignment with respect to the burst boundaries can be determined by combinatorial logic in the video decoder 505.

In general, the technique can improve read efficiency significantly in circuit 500 during motion compensation.

The methods described above may be implemented using one or more data processing devices. In some embodiments, the data processing devices may implement the functionality of the present invention in hardware, using, for example, a computer chip. The data processing device may receive signals in analog or digital form. In other embodiments, the data processing device may implement the functionality of the present invention as machine readable memory storing a plurality of executable instructions on a general purpose computer, video display device, or other electronic device. In such an embodiment, the program may be written in any one of a number of programming languages, such as FORTRAN, PASCAL, C, C++, C#, Tcl, or BASIC. Further, the program can be written in a script, macro, or functionality embedded in commercially available software, such as EXCEL or VISUAL BASIC.

Additionally, the software could be implemented in an assembly language directed to a microprocessor resident on a video display device, computer or other electronic device. For example, the software can be implemented in Intel 80×86 assembly language if it is configured to run on an IBM PC or PC clone. The software may be embedded on an article of manufacture including, but not limited to, "machine-readable program means" such as a floppy disk, a hard disk, an optical disk, a magnetic tape, a PROM, an EPROM, ROM, or CD-ROM.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for managing bursts of data, the method comprising:

storing data in a machine readable memory device a first time at a first memory address;
the machine readable memory device having two or more burst boundaries; and
the first memory address having a first alignment with respect to the burst boundaries;

storing the data in the machine readable memory device a second time at a second memory address, the second memory address having a second alignment with respect to the burst boundaries, the second alignment offset from the first alignment relative to the burst boundaries, the offset sufficient to enable selection for retrieval of the data from the first alignment or the second alignment; and decoding a frame with a video decoder using at least a portion of the data, wherein the data represents at least one reference frame.

2. The method of claim 1 wherein the video decoder is an H.264 codec.

3. The method of claim 1 wherein the machine readable memory device comprises volatile memory.

4. The method of claim 3 wherein the volatile memory is one of static random access memory and dynamic random access memory.

5. The method of claim 1 wherein the machine readable memory device comprises non-volatile memory.

6. The method of claim 5 wherein the non-volatile memory is read-only memory.

7. The method of claim 1 further comprising storing the data in the machine readable memory device a third time at a third memory address, the third memory address having a third alignment with respect to the burst boundaries.

8. The method of claim 7, further comprising:
outputting the decoded frame.

9. The method of claim 8, wherein outputting the decoded frame comprises displaying the decoded frame.

10. The method of claim 1, further comprising:
outputting the decoded frame.

11. The method of claim 10, wherein outputting the decoded frame comprises displaying the decoded frame.

12. A method for use in managing bursts of data, the method comprising:

determining a set of desired bytes of data, the set of desired bytes of data having been previously stored in a machine readable memory device at two or more memory addresses, the memory device having at least two burst boundaries, and each memory address offset from the other memory address relative to the burst boundaries, the offset sufficient to enable selection for retrieval of the data from only one of the memory addresses; and retrieving the desired bytes of data from a preferred memory address, the preferred memory address being aligned with the at least one burst boundary such that the number of bursts necessary to read the desired bytes from the preferred memory address is fewer than the number of bursts necessary to read the desired bytes from the other memory addresses; and decoding a frame with a video decoder using at least a portion of the data, wherein the data represents at least one reference frame.

13. The method of claim 12 wherein the video decoder is an h.264 codec.

14. The method of claim 12 wherein the machine readable memory device comprises volatile memory.

15. The method of claim 14 wherein the volatile memory is one of static random access memory and dynamic random access memory.

16. The method of claim 12 wherein the machine readable memory device comprises non-volatile memory.

17. The method of claim 16 wherein the non-volatile memory is read-only memory.

18. A circuit for decoding video data, the circuit comprising:

a machine readable memory device, having two or more burst boundaries, for storing data starting at a first memory address that has a first alignment with respect to the burst boundaries, and concurrently storing the data starting at a second memory address that has a second alignment with respect to the burst boundaries, the second alignment offset from the first alignment relative to the burst boundaries, the offset sufficient to enable selection for retrieval of the data from the first alignment or the second alignment; and a circuit for writing the data to the machine readable memory device a first time starting at the first memory address that has the first alignment with respect to the burst boundaries and writing the data in the machine readable memory device a second time starting at the second memory address that has the second alignment with respect to the burst boundaries; and a video decoder for decoding a frame at least a portion of the data, wherein the data represents at least one reference frame.

19. The circuit of claim 18, further comprising:
outputting the decoded frame.

20. The circuit of claim 19, wherein outputting the decoded frame comprises displaying the decoded frame.

21. A circuit for decoding video data, said circuit comprising:

a machine readable memory device, having two or more burst boundaries, for storing data starting at a first memory address that has a first alignment with respect to burst boundaries, and concurrently storing the data starting at a second memory address that has a second alignment with respect to the burst boundaries, the second alignment offset from the first alignment relative to the burst boundaries, the offset sufficient to enable selection for retrieval of the data from the first alignment or the second alignment; and a circuit for determining a first number of bursts for retrieving the data from the first address and determining a second number of bursts for retrieving the data from the second address and retrieving the data from the first address if the first number of bursts is fewer than the second number, and retrieving the data from the second address if the second number of bursts is fewer than the first number; and a video decoder for decoding a frame at least a portion of the data, wherein the data represents at least one reference frame.

22. The circuit of claim 21, further comprising:
outputting the decoded frame.

23. The circuit of claim 22, wherein outputting the decoded frame comprises displaying the decoded frame.

* * * * *

UNITED STATES PATENT AND TRADEMARK OFFICE
CERTIFICATE OF CORRECTION

PATENT NO. : 7,583,732 B2  Page 1 of 1
APPLICATION NO. : 10/729443
DATED : September 1, 2009
INVENTOR(S) : Gordon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Fourteenth Day of September, 2010

David J. Kappos
*Director of the United States Patent and Trademark Office*